Patented June 16, 1936

2,044,010

UNITED STATES PATENT OFFICE 2,044,010

INSECTICIDE

Lindley E. Mills, Midland, Mich., assignor to The Dow Chemical Company, Midland, Mich., a corporation of Michigan No Drawing. Application July 17, 1934,
Serial No. 735,713

7 Claims. (Cl. 167—28)

The invention relates to improvements in insecticidal compositions; and particularly to oil emulsions for use against insects, such as aphids, red spider, mealy bug, codling moth, thrips, etc.

It is among the objects of the invention to provide an effective, inexpensive composition comprising a petroleum fraction and a second ingredient, having a greater toxic value than the oil emulsion compositions heretofore known in the art at concentrations non-injurious to foliage. To the accomplishment of the foregoing and related ends, the invention then consists of the composition of ingredients hereinafter fully described and particularly pointed out in the claims.

It is an established fact that insecticidal emulsions containing slightly more than 2 per cent of a petroleum oil having a sulphonation value below 85 will burn foliage sprayed therewith. Certain foliage, such as that of the pear, apple, and other fruit trees in humid weather, will not safety tolerate even this low concentration of oil. A satisfactory killing effect can not be obtained with an oil having a sulphonation value above 85, at concentration below 2 per cent.

I have now found that when a chlorinated derivative of diphenyl or of diphenyloxide is incorporated in the proper proportions with a petroleum fraction in a dilute aqueous emulsion, there is produced a composition having a high toxic value with no burning effect on foliage during use. The percentage of chlorinated diphenyl or diphenyloxide which I include with the petroleum fraction in an aqueous emulsion is generally between 1.0 per cent and 65.0 per cent of the weight of the petroleum fraction used. For example, I may use between about 5.0 per cent and about 50.0 per cent of monochlorodiphenyl; or between about 10 per cent and about 50.0 per cent of pentachloro-diphenyloxide or between about 1.0 per cent and about 65 per cent of pentachloro-diphenyl; all percentages being by weight based on the quantity of the petroleum fraction used.

The quantity of the petroleum fraction utilized will depend in general upon the sulphonation value thereof, the higher this value, the more of the fraction required to obtain the same toxicity. I can use petroleum fractions having sulphonation values at any point above 50 preferably between about 80 and about 85. Ordinarily, the per cent by weight of petroleum fraction in the finished aqueous emulsion ready for spraying will not exceed about 1.2 per cent, and the quantity of chlorinated diphenyl or chlorinated diphenyloxide therein will not exceed about 0.4 per cent.

In a composition prepared according to the present invention, the oil concentration is usually below 1.2 per cent, and preferably below 1.0 per cent. The concentration of chlorinated diphenyl or diphenyloxide is preferably below about 0.4 per cent and ordinarily about 0.2 per cent. The concentration of both oil and chlorinated compound as sprayed on foliage is far below that at which any burning effect will be encountered. Now at such low concentrations of oil and chlorinated diphenyl or diphenyloxide it would be expected that the toxicity of the emulsion would be very low. However, I have found that the toxicity of a mixture of a petroleum fraction and a chlorinated diphenyl or diphenyloxide is far greater than that of the sum of the toxicities of the individual components, as shown in the following tables.

The tables show the comparative mortality obtained by the use of varying concentrations of mixtures of oil and chlorinated diphenyl or chlorinated diphenyloxide as against the individual ingredients. All of the figures given in the tables indicate percentages, the percentage of oil and of chlorinated compound being those by weight present in the emulsion, as sprayed on the foliage. The per cent mortality was determined in the following manner:—

Wingless adult females of the *Aphis rumicis* were placed on a disc of cotton flannel in a petri dish and sprayed under identical conditions with aqueous emulsions containing varying concentrations of oil having a sulphonation value of about 80 and a viscosity of about 90 Saybolt, and chlorinated diphenyl or diphenyloxide. After having been sprayed for 15 seconds, the aphids were removed from the flannel with a camel's hair brush and placed on a nasturtium leaf mounted in a wide-mouth bottle having a small amount of water in the bottom thereof. The number of dead and living aphids on the leaves at the end of 24 hours was then determined.

Table I

| Oil | Mortality | Penta-chloro-diphenyl | Mortality | Composition | | |
|---|---|---|---|---|---|---|
| | | | | Oil | Penta-chloro-diphenyl | Mortality |
| 0.50 | 40 | | | 0.50 | | 40 |
| 0.475 | 37 | 0.025 | 5 | 0.475 | 0.025 | 90 |
| 0.40 | 31 | 0.10 | 18 | 0.40 | 0.10 | 97 |
| 0.35 | 26 | 0.15 | 25 | 0.35 | 0.15 | 95 |
| 0.30 | 21 | 0.20 | 32 | 0.30 | 0.20 | 91 |
| 0.25 | 17 | 0.25 | 38 | 0.25 | 0.25 | 84 |
| 0.125 | 8 | 0.375 | 44 | 0.125 | 0.375 | 63 |
| | | 0.50 | 51 | | 0.50 | 51 |

Table II

| Oil | Mortality | Mono-chloro-diphenyl | Mortality | Composition | | Mortality |
|---|---|---|---|---|---|---|
| | | | | Oil | Mono-chloro-diphenyl | |
| 0.50 | 40 | | | 0.50 | | 40 |
| 0.475 | 37 | 0.025 | 5 | 0.475 | 0.025 | 69 |
| 0.40 | 31 | 0.10 | 18 | 0.40 | 0.10 | 86 |
| 0.35 | 26 | 0.15 | 22 | 0.35 | 0.15 | 86 |
| 0.30 | 21 | 0.20 | 33 | 0.30 | 0.20 | 79 |
| 0.25 | 17 | 0.25 | 40 | 0.25 | 0.25 | 67 |
| 0.125 | 8 | 0.375 | 56 | 0.125 | 0.375 | 59 |
| | | 0.50 | 84 | | 0.50 | 84 |

Table III

| Oil | Mortality | Penta-chloro-diphenyl-oxide | Mortality | Composition | | Mortality |
|---|---|---|---|---|---|---|
| | | | | Oil | Penta-chloro-diphenyl-oxide | |
| 0.50 | 40 | | | 0.50 | | 40 |
| 0.475 | 37 | 0.025 | 4 | 0.475 | 0.025 | 61 |
| 0.40 | 31 | 0.10 | 14 | 0.40 | 0.10 | 80 |
| 0.35 | 26 | 0.15 | 20 | 0.35 | 0.15 | 78 |
| 0.30 | 21 | 0.20 | 25 | 0.30 | 0.20 | 75 |
| 0.25 | 17 | 0.25 | 29 | 0.25 | 0.25 | 69 |
| 0.125 | 8 | 0.375 | 33 | 0.125 | 0.375 | 55 |
| | | 0.50 | 37 | | 0.50 | 37 |

Table IV

| Oil | Mortality | Dichloro-diphenyl-oxide | Mortality | Composition | | Mortality |
|---|---|---|---|---|---|---|
| | | | | Oil | Dichloro-diphenyl-oxide | |
| 0.50 | 40 | | | 0.50 | | 40 |
| 0.475 | 37 | 0.025 | 7 | 0.475 | 0.025 | 59 |
| 0.40 | 31 | 0.10 | 27 | 0.40 | 0.10 | 92 |
| 0.35 | 26 | 0.15 | 37 | 0.35 | 0.15 | 96 |
| 0.30 | 21 | 0.20 | 44 | 0.30 | 0.20 | 95 |
| 0.25 | 17 | 0.25 | 47 | 0.25 | 0.25 | 93 |
| 0.125 | 8 | 0.375 | 58 | 0.125 | 0.375 | 86 |
| | | 0.50 | 73 | | 0.50 | 73 |

The foregoing Table I shows that, for example, the incorporation of 0.10 per cent of pentachloro-diphenyl with 0.40 per cent of an oil having a sulphonation value between 80 and 85, in an aqueous emulsion produces a toxic value of 97 as against the additive values of the substances, which is 31+18 or 49. Again, at 0.30 of oil and 0.20 per cent of pentachloro-diphenyl, the toxic value of the mixture is 91 contrasted with 21+32 or 53, the additive value of the separate ingredients. Likewise, Tables II, III, and IV show that the actual toxic value of the mixtures are far above the additive values of the separate ingredients.

As an example of my improved insecticide, I may prepare a concentrate, in which form the emulsion is usually marketed, consisting of the following:—

| Ingredients | Percent by weight |
|---|---|
| Petroleum fraction (sulphonation value 80) | 60.0 |
| Pentachloro-diphenyl | 20.0 |
| Sodium caseinate | 2.0 |
| Water | 18.0 |
| | 100.0 |

Another example of my improved insecticide is as follows:—

| Ingredients | Percent by weight |
|---|---|
| Petroleum fraction (sulphonation value 80) | 60.0 |
| Pentachloro-diphenyloxide | 20.0 |
| Sodium caseinate | 2.0 |
| Water | 18.0 |
| | 100.0 |

The preparation of the foregoing concentrate is accomplished by dissolving the emulsifying agent in water and then slowly adding the mixture of a petroleum distillate and the halogenated diphenyl or halogenated phenyl ether to the water solution with agitation. One part of the concentrate is then to be incorporated with 40–200 parts by weight of water to prepare a solution of proper strength for spraying on foliage.

As an example a finished emulsion may therefore contain:—

| Ingredients | Percent by weight |
|---|---|
| Petroleum fraction | 0.60 |
| Pentachloro-diphenyl | 0.20 |
| Sodium caseinate | 0.02 |
| Water | 99.18 |
| | 100.00 |

Sodium caseinate was employed as an emulsifying agent, but other salts of casein, such as the potassium, calcium, or ammonium salts can also be used, as well as other known emulsifiers, such as linoleates, oleates, etc. An emulsifying agent which will give an emulsion having a particle size of 6 to 8 microns in diameter is desirable, and the caseinates produce approximately this size of particle. If the emulsions have a much smaller particle size, they do not break rapidly enough to have the best killing effect.

As an example, the optimum percentage ranges of ingredients in my finished emulsions may be as follows:—

| Ingredients | Percent by weight | |
|---|---|---|
| Petroleum fraction | 0.30– | 1.50 |
| Halogenated diphenyl or diphenyloxide | 0.10– | 0.50 |
| Sodium caseinate | 0.01– | 0.05 |
| Water | 99.59– | 98.95 |
| | 100.00 | 100.00 |

Among the advantages of my improved insecticidal emulsion are: (1) it has a very high toxic value with an extremely low concentration of active ingredients; (2) it does not burn the foliage of plants and trees at concentrations giving a high toxicity, even in very humid weather; and, (3) better colored fruit is obtained because the low concentration of oil in the finished emulsion does not cause the formation of thick oil films on fruit sprayed therewith, which may interfere with the natural coloration of the fruit by the sun's rays.

Other modes of applying the principle of my invention may be employed instead of those explained, change being made as regards the materials employed, provided the ingredients stated by any of the following claims or the equivalent of such stated ingredients be employed.

I therefore particularly point out and distinctly claim as my invention:—

1. A composition of matter comprising a petroleum fraction having a sulphonation value above 50, an emulsifying agent, water, and a compound selected from the group consisting of the chlorinated derivatives of diphenyl and diphenyloxide.

2. A composition of matter comprising a petroleum fraction having a sulphonation value above 50, a water soluble salt of casein, water, and a compound selected from the group consisting of the chlorinated derivatives of diphenyl and diphenyloxide.

3. An insecticidal composition suitable for application on the foliage of plants and trees without causing injury thereto, containing by weight

|  | Per cent |  |
|---|---|---|
| Petroleum fraction having a sulphonation value above 50 | 0.30– | 1.50 |
| A compound selected from the group consisting of the chlorinated derivatives of diphenyl or diphenyloxide | 0.10– | 0.50 |
| An emulsifying agent | 0.01– | 0.05 |
| Water | 99.59– | 98.95 |
|  | 100.00 | 100.00 |

4. A concentrate containing a petroleum fraction having a sulphonation value above 50 adapted to be diluted with water to form an insecticidal composition suitable for application on the foliage of plants and trees without causing injury thereto comprising a chlorinated derivative of diphenyl, such diluted composition having a toxic value greater than the additive toxic values of the separate ingredients.

5. A concentrate containing a petroleum fraction having a sulphonation value above 50 adapted to be diluted with water to form an insecticidal composition suitable for application on the foliage of plants and trees without causing injury thereto comprising a chlorinated derivative of diphenyloxide, such diluted composition having a toxic value greater than the additive toxic values of the separate ingredients.

6. An insecticidal composition comprising a petroleum fraction having a sulphonation value above 50 suitable for application on the foliage of plants and trees without causing injury thereto containing a chlorinated derivative of diphenyl, the toxic value of which composition is greater than the additive toxic values of the separate ingredients.

7. An insecticidal composition comprising a petroleum fraction having a sulphonation value above 50 suitable for application on the foliage of plants and trees without causing injury thereto containing a chlorinated derivative of diphenyloxide, the toxic value of which composition is greater than the additive toxic values of the separate ingredients.

LINDLEY E. MILLS.